US007619193B2

(12) United States Patent
Deurenberg

(10) Patent No.: US 7,619,193 B2

(45) Date of Patent: Nov. 17, 2009

(54) SYSTEM AND METHOD FOR CONTROLLING A LED LUMINARY

(75) Inventor: Peter Hubertus Franciscus Deurenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/916,099

(22) PCT Filed: May 29, 2006

(86) PCT No.: PCT/IB2006/051691

§ 371 (c)(1), (2), (4) Date: Nov. 30, 2007

(87) PCT Pub. No.: WO2006/129260

PCT Pub. Date: Dec. 7, 2006

(65) Prior Publication Data

US 2008/0203273 A1 Aug. 28, 2008

(30) Foreign Application Priority Data

Jun. 3, 2005 (EP) ................................ 05104860

(51) Int. Cl.

*G01J 1/32* (2006.01)

*H01J 40/14* (2006.01)

(52) U.S. Cl. ...................................... 250/205; 250/238

(58) Field of Classification Search ................. 250/205, 250/226, 206, 201.1, 238, 214 R, 214 P; 362/227, 234, 253, 800, 276; 315/158, 159, 315/154, 307, 291, 149, 169.3

See application file for complete search history.

(56) References Cited

U.S. PATENT DOCUMENTS 5,783,909 A 7/1998 Hochstein (Continued)

FOREIGN PATENT DOCUMENTS

DE 20309033 12/2003

(Continued)

OTHER PUBLICATIONS

Subramanium Muthu et al: "Red, Green and Blue LED's for White Light Illumination", IEEE Journal on Selected Topics in Quantum Electronics, vol. 8, No. 2, pp. 333-338, 2002.

(Continued)

*Primary Examiner*—Que T Le

*Assistant Examiner*—Jennifer Bennett

(57) ABSTRACT

The present invention relates to a control system (10; 30; 50) for a LED luminary (12) including a plurality of LED light sources of multiple colors for producing a mixed color light. The control system comprises means (22) for controlling the LED light sources in accordance with a difference between set point values representing a desired light output and first control data provided by at least one optical sensor (14; 32) responsive to a property of the light produced by the LED light sources. The control system is characterized by means (26; 38) for compensating said set point values in accordance with second control data provided by a temperature sensor (24) responsive to the temperature of the optical sensor(s) (14; 32). The additional temperature sensor makes it possible to compensate for changes in the spectral sensitivity of the optical sensor(s), whereby the color stability of the LED luminary with integrated optical sensors can be increased. The invention also relates to a corresponding control method.

4 Claims, 2 Drawing Sheets

U.S. PATENT DOCUMENTS

| | | | | |
|---|---|---|---|---|
| 6,441,558 | B1 * | 8/2002 | Muthu et al. | 315/149 |
| 6,448,550 | B1 | 9/2002 | Nishimura | |
| 6,596,977 | B2 * | 7/2003 | Muthu et al. | 250/205 |
| 7,319,298 | B2 * | 1/2008 | Jungwirth et al. | 315/307 |
| 2002/0097000 | A1 | 7/2002 | Muthu et al. | |
| 2002/0179816 | A1 | 12/2002 | Haines et al. | |
| 2004/0113044 | A1 | 6/2004 | Ishiguchi | |
| 2005/0002019 | A1 * | 1/2005 | Schrodinger | 356/218 |

FOREIGN PATENT DOCUMENTS

| | | | |
|---|---|---|---|
| WO | 0037904 | | 6/2000 |
| WO | 0247438 | A1 | 6/2002 |
| WO | 02052901 | A2 | 7/2002 |
| WO | 02099333 | A1 | 12/2002 |
| WO | 03037042 | A1 | 5/2003 |
| WO | 03053111 | A1 | 6/2003 |
| WO | 2006011108 | A1 | 2/2006 |

OTHER PUBLICATIONS

Subramanium Muthu and James Gaines: “Red, Green and Blue LED Based White Light Source”, 2003 IEEE, pp. 515-522.

Subramanium Muthu et al: “Red, Green and Blue LED Based White Light Generation”, 2002 IEEE, pp. 327-333.

* cited by examiner

SYSTEM AND METHOD FOR CONTROLLING A LED LUMINARY

FIELD OF THE INVENTION

The present invention relates to a control system for a LED luminary, which luminary includes a plurality of LED light sources of multiple colors for producing a mixed color light. The invention also relates to a corresponding control method.

BACKGROUND

Mixing multiple colored light emitting diodes (LEDs) to obtain a mixed color is a common way to generate white or colored light. The generated light is determined by the type of LEDs used, as well as by the mixing ratios. However, the optical characteristics of the LEDs change when the LEDs rise in temperature during operation: the flux output decreases and the peak wavelength shifts.

To overcome this problem, various feedback systems have been proposed in order to compensate for these changes in optical characteristics of the LEDs during use. These feedback systems provide an improvement in the color stability of the LED luminary. Examples of such feedback systems are disclosed in for example the documents WO03/037042 and WO02/47438. WO03/037042 discloses a LED luminary control system, which comprises a feedback unit generating feedback values representative of the actual mixed color light produced by the LED luminary. The feedback values are obtained from measurements by means of photodiodes. The system further comprises a controller for adjusting the LEDs in accordance with a difference between the obtained feedback values and reference or set point values representing a desired mixed color light. In this way, changes in LED characteristics can be compensated so that the LED luminary generates a desired mixed color light.

However, a problem with the above feedback system, as well as with other known feedback systems, is that in a realistic embodiment the photodiodes or other optical sensors detecting the actual output of LEDs will be integrated in the LED luminary. Consequently, not only the LEDs rise in temperature during operation but also the optical sensors. When the temperature of the optical sensors raises, the spectral sensitivity of the sensors changes due to a change in the sensor's quantum efficiency. This means that the measurements from the sensors are affected, which will lead to significant color change of the LED luminary. Already a temperature rise of about 60° C. can result in a clearly visible color change of the output of the LED luminary.

DETAILED DESCRIPTION

It is an object of the present invention to overcome this problem, and to provide an improved control system for a LED luminary.

This and other objects that will be evident from the following description are achieved by means of a control system for a LED luminary, and a corresponding method, according to the appended claims.

According to an aspect of the invention, there is provided a control system for a LED luminary including a plurality of LED light sources of multiple colors for producing a mixed color light, which control system comprises means for controlling the LED light sources in accordance with a difference between set point values representing a desired light output and first control data provided by at least one optical sensor responsive to a property of the light produced by the LED light sources, and means for compensating the set point values in accordance with second control data provided by a temperature sensor responsive to the temperature of the optical sensor(s).

The invention is based on the understanding that by providing a temperature sensor that can measure the temperature of the optical sensor(s) it is possible to take into account the changes in spectral sensitivity of the optical sensors (due to temperature changes) when controlling/adjusting the LEDs, whereby the color stability of the LED luminary with integrated optical sensors is increased and a desired mixed color can be generated. Thus, the compensation means and temperature sensor forms a feed forward system in addition to the existing feedback system, and provides compensated set point values to be used by the control system. Also, the system is more temperature stable.

The temperature of the optical sensor(s) can be obtained by measuring the temperature of a heat sink accommodating the LEDs and optical sensor(s). In this case, the temperature sensor is provided in connection to the heat sink. Alternatively, the temperature can be measured by direct temperature measurements, such as determining the sensor temperature through the leakage current of the diode.

According to an embodiment of the invention, the set point values relate to a desired mixed color output, i.e. a certain color and lumen output, and the at least one optical sensor are filtered sensors. The filtered sensors can provide first control data representing the actual generated mixed color light, which first control data can be compared to the compensated set point values relating to a desired mixed color light, in order to compensate for instance for wavelength shifts as the LEDs rise in temperature.

According to another embodiment of the invention, the set point values relate to a desired flux output, and the at least one optical sensor is an unfiltered sensor. The unfiltered sensor can provide first control data relating to the actual flux of the light generated by the LED light sources, which first control data can be compared to the compensated set point values relating to a desired flux, in order to compensates for changes in flux as the LEDs rise in temperature. Here, the LED light sources are preferably further controlled in accordance with second set point values representing a desired mixed color output.

In yet another embodiment of the invention, wherein the set point values relates to a desired flux of the output of the LED luminary, the control system can further comprises means for calculating the temperature of each LED light source, which calculated LED light source temperatures are included in the second control data. In this way, the flux set point values can be compensated regarding both the optical sensor's spectral sensitivity and the LEDs' wavelength shifts. The temperature of each LED light source can also be used to compensate the second set point values representing a desired mixed color output, in order to account for the wavelength shifts as the temperature of the LEDs changes. The temperature of each LED light source can for example be calculated based on heat sink temperature, a thermal model of the LED light sources and electrical current input to the LED light sources.

According to another aspect of the invention, there is provided a method for controlling a LED luminary including LEDs of a plurality of colors for producing a mixed color light, which method comprises controlling the LED light sources in accordance with a difference between set point values representing a desired light output and first control data provided by at least one optical sensor responsive to a property of the light produced by the LED light sources, and compensating said set point values in accordance with second control data provided by a temperature sensor responsive to the temperature of the optical sensor(s). This method offers similar advantages as obtained with the previously discussed aspect of the invention.

These and other aspects of the present invention will now be described in more detail; with reference to the appended drawings showing currently preferred embodiments of the invention.

In the figures, similar elements are represented by the same reference numbers.

Figure 1:
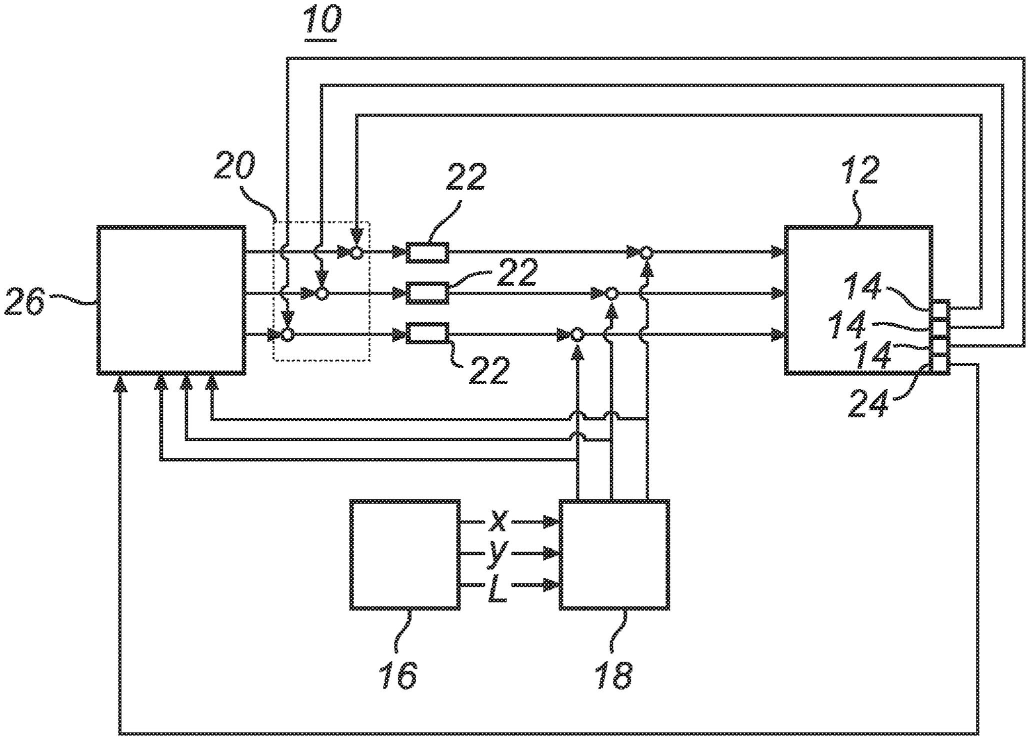
FIG. 1 is a circuit diagram showing a control system for a LED luminary according to an embodiment of the invention.

FIG. 1 discloses a control system 10 for a LED luminary 12 according to an embodiment of the present invention. The LED luminary or lighting system 12 includes drivers and a plurality of LED light sources having different colors (not shown). The lighting system 12 can for example comprise one LED light source including LEDs adapted to emit red light, one LED light source including LEDs adapted to emit green light, and one LED light source including LEDs adapted to emit blue light. The lighting system 12 produces for instance white light by mixing the output of the different LED light sources.

In connection to the lighting system 12 there is provided three color sensors 14, which sensors are adapted to detect red, green and blue light, respectively. The color sensors 14 can be filtered photodiodes. The sensors 14 convert the mixed color light produced by the lighting system 12 into three sensor values or feedback values (first control data) corresponding to red, green and blue, respectively. Thus, the feedback values are representative of the actual produced mixed color light.

The LED luminary control system 10 further comprises a user interface 16 and a calibration matrix 18. A user input indicating a desired lumen output and color of the LED luminary is received through the user interface 16. The user input can for example be on the form CIE x,y,L representing a certain position in the CIE 1931 chromaticity diagram. The user input is transferred to the calibration matrix 18, which calculates set point values based on the user input. Thus, the set point values represent a desired value of the mixed color light.

Additionally, the LED luminary control system 10 comprises a block 20 for comparing any set point values to corresponding feedback values (first control data) supplied by the color sensors 14, and PID (proportional-integral-derivative) controllers 22 for modifying the output of the different LED light sources in the lighting system 12 based on the differences derived from block 20, in order to produce the desired mixed color light. The output of the PID controllers 22 is further multiplied with output of the calibration matrix 18 before being passed to the lighting system 12. Thus, the color sensors 14, block 20, and the PID controllers 22 form part of a feedback system in the control system 10 which compensates for instance for wavelength shifts as the LEDs rise in temperature.

In accordance with the current embodiment of the invention, the LED luminary control system 10 further comprises a temperature sensor 24 and a compensation block 26, which aim to take into account the changes in spectral sensitivity of the optical sensors due to temperature changes.

The temperature sensor 24 is adapted to detect the temperature of the optical sensors 14. Upon operation, the temperature detected by the temperature sensor 24, i.e. the current sensor temperature (second control data), is supplied to the compensation block 26. The compensation block 26 converts the set point values of the calibration matrix 18 (which are valid only when the sensors' temperature is at a certain calibration temperature) to reflect the changes in the sensors' spectral sensitivity at the current sensor temperature. Further, the adjusted set point values are compared to the corresponding feedback values in block 20, and the differences between the set point and feedback values are passed onto the three PID controllers 22 which take action accordingly. That is, based on the obtained differences the controllers 22 modify the output of the LED light sources in the lighting system 12 to produce the desired mixed color light.

Thus, when implementing the temperature sensor 24 and compensation block 26 in the LED luminary control system 10, the set point values which are compared to the corresponding feedback values in block 20 are already compensated as a function of the temperature of the optical sensors 14, whereby the input to the PID controllers 22 and consequently the adjustments of the LED light sources are affected. As mentioned above, taking into account the change in the sensors' spectral sensitivity results in a LED luminary having increased color stability.

Figure 2:
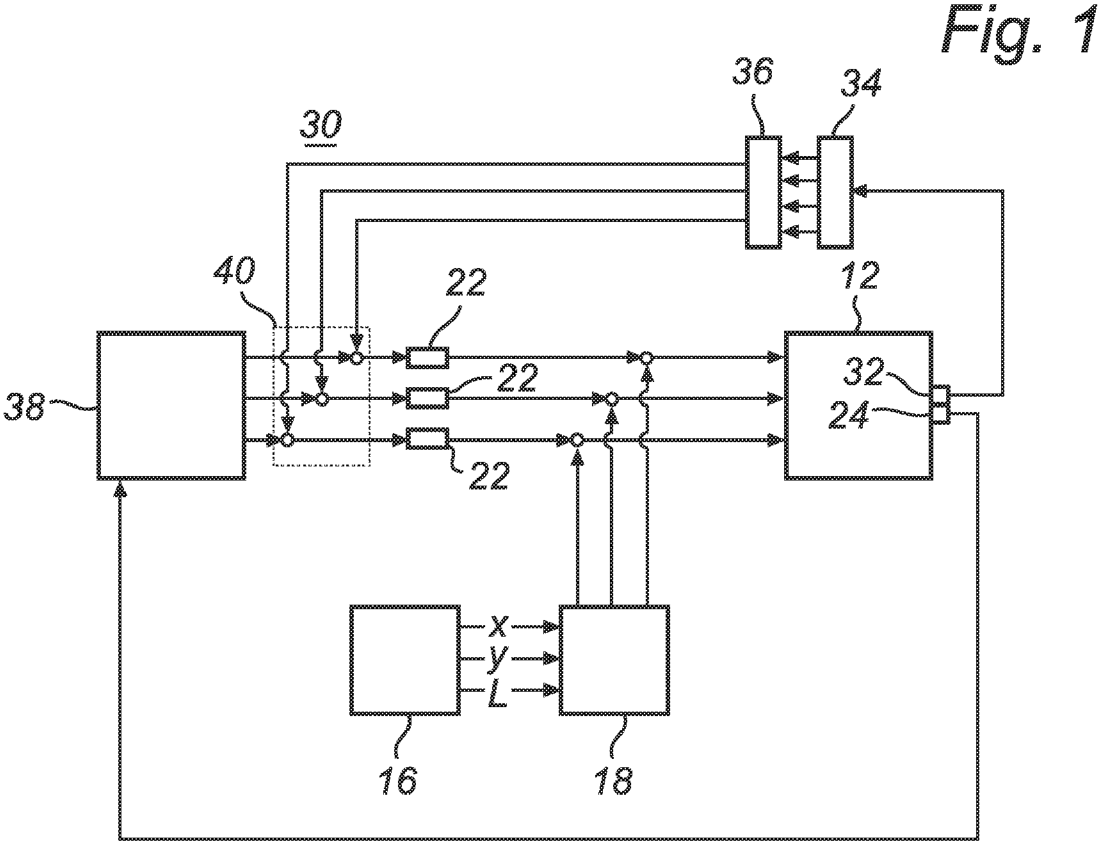
FIG. 2 is a circuit diagram showing a control system for a LED luminary according to another embodiment of the invention.

FIG. 2 discloses a control system 30 for a LED luminary 12 according to another embodiment of the present invention. A difference between the control system 30 and the control system 10 of FIG. 1 is that the feedback system in the control system 30 only compensates for flux output changes as the LED light sources rise in temperature, while wavelength shifts are not compensated.

Accordingly, the control system 30 comprises an unfiltered photodiode 32 provided in connection to the lighting system 12, which unfiltered photodiode 32 is adapted to detect LED flux levels. As such the unfiltered photodiode 32 cannot distinguish between red, green and blue light. Therefore, in order to independently measure the flux of each LED color, the lighting system's output is measured time sequentially by sequentially switching the different LED colors on/off. This essentially time multiplexes the sensor. The flux output of each LED color is then determined by time multiplexor 34 and color signal extractor 36.

The control system 30 further comprises a flux reference block 38, which provides set point values representing desired flux output of the LED light sources (which set point values generally are pre-determined through an initial calibration), and a block 40 for comparing any set point values to corresponding feedback values (first control data) supplied by the photodiode 32. PID controllers 22 are further adapted to modify the output of the different LED light sources in the lighting system 12 based on the differences derived from block 40, in order to produce light having the desired flux. In order to implement the color chosen by a user, the output of the PID controllers 22 can be multiplied with output (second set point values) from a calibration matrix 18 connected to a user interface 16 before being passed to the lighting system 12. Thus, the unfiltered photodiode 32, the block 40, and the PID controllers 22 form part of a feedback system in the control system 30 which compensates for flux changes as the LEDs rise in temperature.

In accordance with the current embodiment of the invention, the LED luminary control system 30 further comprises a temperature sensor 24, which makes it possible to take into account the changes in spectral sensitivity of the photodiode 32 due to temperature changes.

The temperature sensor 24 is adapted to detect the temperature of the unfiltered photodiode 32. Upon operation, the temperature detected by the temperature sensor 24, i.e. the current photodiode temperature (second control data), is supplied to the flux reference block 38, wherein the original set point values are converted in order to derive the correct flux set point values at the measured photodiode temperature. Thus, if the temperature of the photodiode changes, the flux reference will change accordingly. Consequently, the set point values which are compared to the corresponding feedback values in block 40 are already compensated as a function of the temperature of the photodiode 32, whereby the input to the PID controllers 22 and consequently the adjustments of the LED light sources are affected. As mentioned above, taking into account the change in the sensors' spectral sensitivity results in a LED luminary having increased flux stability.

Figure 3:
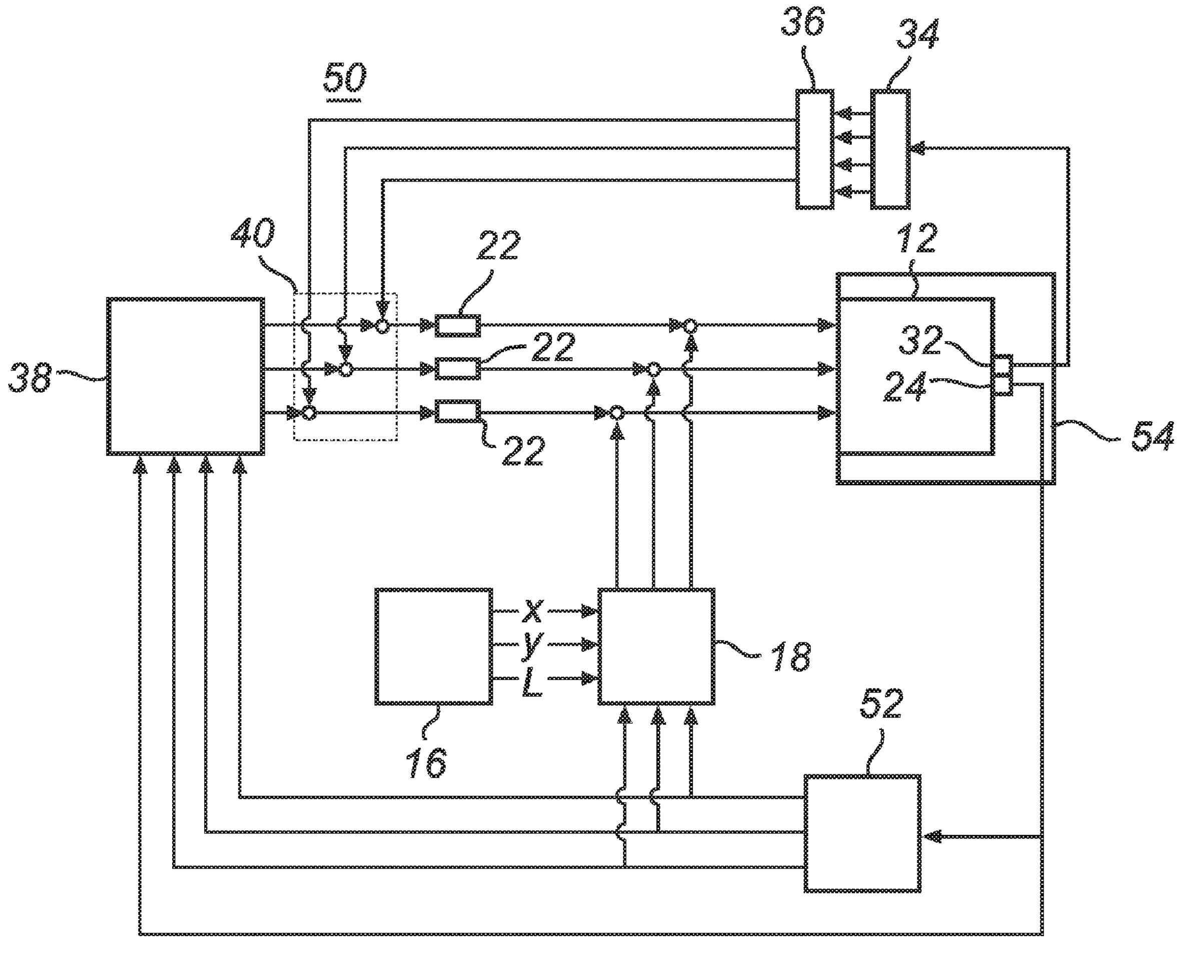
FIG. 3 is a circuit diagram showing a control system for a LED luminary according to yet another embodiment of the invention.

FIG. 3 discloses a control system 50 for a LED luminary 12 according to yet another embodiment of the present invention. The control system 50 is similar to the control system 30 of FIG. 2, except that in the control system 50 there is the additional compensation for the LEDs' wavelength shifts as a function of their junction temperature. The junction temperature is the temperature of the active layer inside the LED.

In addition to the control system 30 of FIG. 2, the control system 50 further comprises means 52 for calculating the temperature (namely the junction temperature) of each LED light source (e.g. red, green and blue LED light sources). The junction temperature can be obtained by first measuring, by means of the temperature sensor 24, the temperature of a heat sink 54 accommodating both the above-mentioned photodiode 32 and the LED light sources of the lighting system 12. The junction temperature of each LED light source can then be estimated (by calculation means 52) by employing the heat sink temperature together with a thermal model of the LED light sources and the electrical current input to the LED light sources. Further, the heat sink temperature is recalculated to obtain the photodiode temperature, which photodiode temperature (second control data) is used to compensate the flux set point values as in the previously discussed embodiment.

The junction temperature data thus obtained by calculation means 52 is provided to the calibration matrix 18 to account for the wavelength shifts as the temperature of the LEDs change. Additionally, the junction temperature data is passed to the flux reference block 38 in order to compensate the flux set point values, as the flux sensitivity of the photodiode also is wavelength dependent. Thus, in this embodiment the second control data comprises both the current sensor temperature and the current LED light source temperatures, whereby the flux set point values are compensated for both the change in the sensor's sensitivity as well as the change in the LEDs' peak wavelength. This leads to increased color stability of the LED luminary.

The person skilled in the art realizes that the present invention by no means is limited to the preferred embodiments described above. On the contrary, many modifications and variations are possible within the scope of the appended claims. For example, the aspect of measuring the optical sensor temperature by measuring the temperature of a heat sink accommodating the optical sensor can be exercised in any embodiment of the invention.

Also, the control system and method according to the invention can be used for different LED combinations, such as RGB, AGB, RAGB, phosphor converted LED systems, etc.

Further, any suitable conversion between a sensor domain and an actuator domain can be implemented in the above systems.

The invention claimed is:

1. A control system for a LED luminary including a plurality of LED light sources of multiple colors for producing a mixed color light, the control system comprising:

means for controlling the LED light sources in accordance with a difference between first set point values representing a desired light output and first control data provided by at least one optical sensor responsive to a property of the light produced by the LED light sources;

means for compensating said first set point values in accordance with second control data provided by a temperature sensor responsive to the temperature of said optical sensor(s), wherein said LED light sources are further controlled in accordance with second set point values representing a desired mixed color output; and means for calculating the temperature of each LED light source and a temperature of said optical sensors, from a temperature of a heat sink measured by the temperature sensor coupled to the heat sink, the heat sink accommodating said LED light sources and the optical sensor(s), wherein the calculated LED light source temperatures are included in said second control data, and said second set point values are compensated in accordance with said calculated LED light source temperatures.

2. A control system according to claim 1, wherein said first set point values relate to a desired mixed color output, and wherein said at least one optical sensor is a filtered sensor.

3. A control system according to claim 1, wherein said first set point values relate to a desired flux output, and wherein said at least one optical sensor is an unfiltered sensor.

4. A method for controlling a LED luminary including a plurality of LED light sources of multiple colors for producing a mixed color light, the method comprising:

controlling the LED light sources in accordance with a difference between first set point values representing a desired light output and first control data provided by at least one optical sensor responsive to a property of the light produced by the LED light sources;

compensating said first set point values in accordance with second control data provided by a temperature sensor responsive to the temperature of said optical sensor(s), wherein a temperature of said optical sensors is calculated from a temperature of a heat sink measured by the temperature sensor coupled to the heat sink, the heat sink accommodating said LED light sources and the optical sensor(s);

controlling the LED light sources in accordance with second set point values representing a desired mixed color output;

calculating the temperature of each LED light source from the temperature of the heat sink, which calculated LED light source temperatures are included in said second control data; and compensating said second set point values in accordance with said calculated LED light source temperatures.

* * * * *